(12) United States Patent
Jaeger

(10) Patent No.: US 7,578,526 B2
(45) Date of Patent: Aug. 25, 2009

(54) RELEASABLE PLIANT NON-MARRING MUD FLAP

(76) Inventor: Jason Jaeger, 295 S. Hewitt Rd., Ypsilanti, MI (US) 48197

( * ) Notice: Subject to any disclaimer, the term of this patent is extended or adjusted under 35 U.S.C. 154(b) by 331 days.

(21) Appl. No.: 11/164,386

(22) Filed: Nov. 21, 2005

(65) Prior Publication Data
US 2007/0036948 A1 Feb. 15, 2007

Related U.S. Application Data

(60) Provisional application No. 60/631,720, filed on Nov. 30, 2004.

(51) Int. Cl.
*B62D 25/16* (2006.01)
(52) U.S. Cl. .................. 280/848; 280/154; 280/847
(58) Field of Classification Search ............. 280/847, 280/848, 154, 849
See application file for complete search history.

(56) References Cited

U.S. PATENT DOCUMENTS

| | | | | |
|---|---|---|---|---|
| 1,730,733 A * | 10/1929 | Judd | ............... | 135/88.05 |
| 4,089,537 A * | 5/1978 | Pralutsky | ............... | 280/851 |
| 4,215,873 A * | 8/1980 | Price | ............... | 280/848 |
| 4,293,140 A * | 10/1981 | Bell et al. | ............... | 280/851 |
| 4,408,939 A * | 10/1983 | Graff et al. | ............... | 411/112 |
| 4,605,238 A * | 8/1986 | Arenhold | ............... | 280/851 |
| 4,724,585 A * | 2/1988 | Whitman | ............... | 24/195 |
| 5,044,667 A * | 9/1991 | Manning | ............... | 280/851 |
| 5,048,868 A * | 9/1991 | Arenhold | ............... | 280/848 |
| 5,833,349 A * | 11/1998 | Apple | ............... | 362/84 |
| 5,967,553 A * | 10/1999 | Cominsky | ............... | 280/847 |
| 5,987,821 A * | 11/1999 | Heim et al. | ............... | 49/502 |
| 6,193,278 B1 * | 2/2001 | Ward et al. | ............... | 280/848 |
| 7,172,008 B2 * | 2/2007 | Vanbenschoten et al. | .... | 156/544 |
| 2007/0128442 A1 * | 6/2007 | Buehler | ............... | 428/411.1 |

* cited by examiner

*Primary Examiner*—Christopher P Ellis
*Assistant Examiner*—John D Walters
(74) *Attorney, Agent, or Firm*—Mark Young, P.A.

(57) ABSTRACT

A removable mud flap includes a panel member having a curved top mounting edge, and a reinforced malleable engagement channel attached along the curved top mounting edge and adapted to frictionally engage a fender flange. The reinforced malleable engagement channel includes an interior U-shaped gripping surface defining a cavity, a plurality of opposed gripping lips protruding into the cavity, a plurality of gripping ribs protruding into said cavity, an exterior surface and an intermediate malleable U-shaped channel disposed between the interior U-shaped gripping surface and the exterior surface. The reinforced malleable engagement channel securely grips a fender flange without damaging the finish of the fender. The mud flap may be removed, without tools and without damaging the fender, by pulling it from the fender.

20 Claims, 3 Drawing Sheets

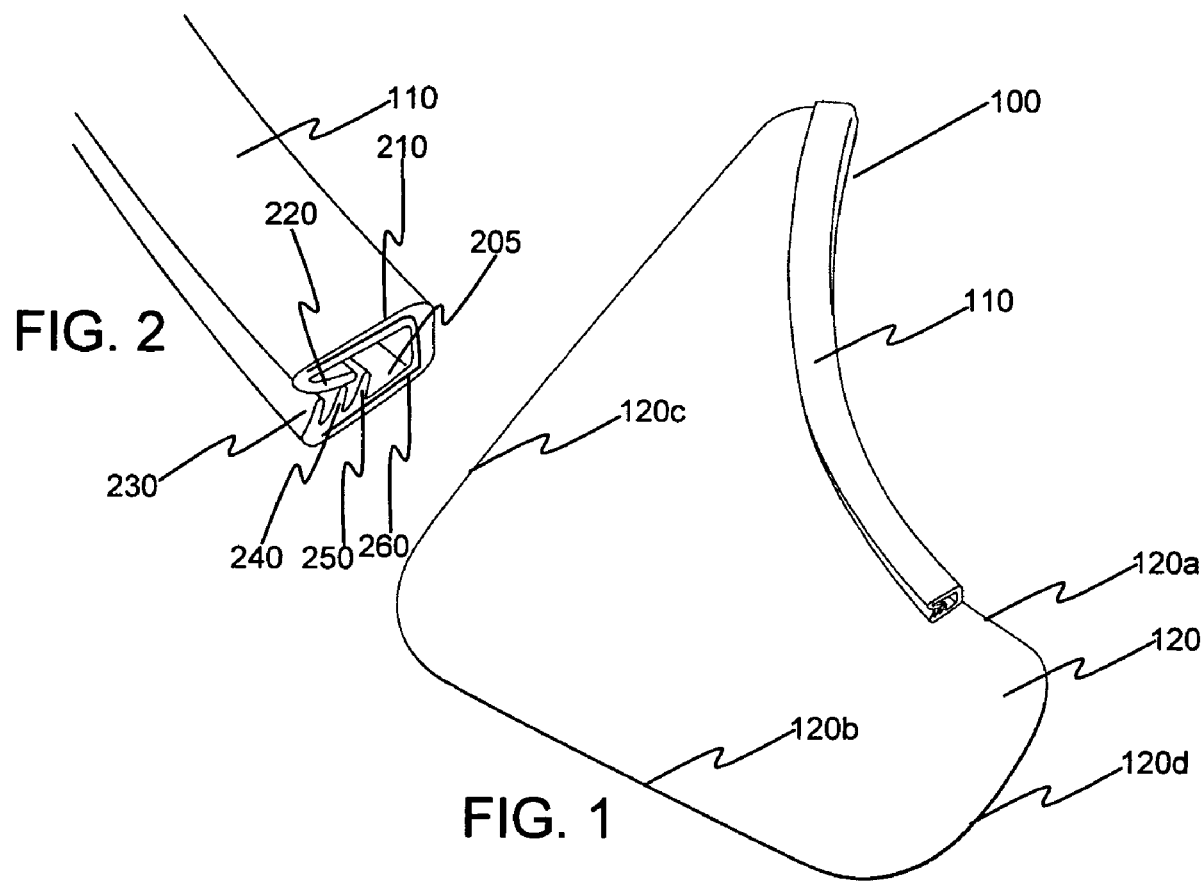
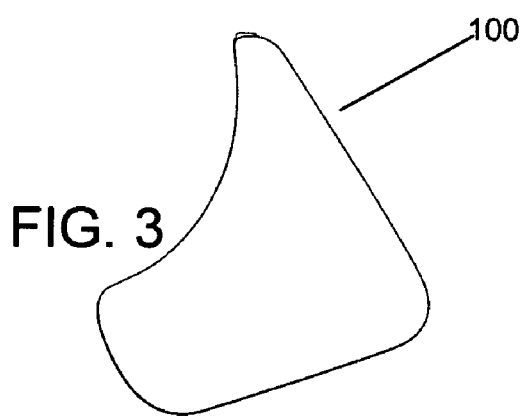

RELEASABLE PLIANT NON-MARRING MUD FLAP

RELATED APPLICATION

This application claims the benefit of priority to U.S. Provisional Application No. 60/631,720 filed Nov. 30, 2004, the entire contents of which are incorporated herein and made a part hereof.

FIELD OF THE INVENTION

This invention generally relates to mud flaps, and more particularly, to a pliant mud flap that may be bent and releasably, yet securely, installed on a fender flange of a vehicle without damaging the flange.

BACKGROUND

Mud flaps are well known in the art. While they generally protect a vehicle from damage due to debris thrown from wheels, conventional mud flaps suffer several shortcomings. First, installation typically entails drilling holes and clamping, bolting or screwing the mud flaps into place. Such processes may materially compromise the finish, corrosion resistance and resale value of a vehicle. A related problem is that removal can be tedious and often leaves bare metal exposed to the elements. Yet another problem with conventional mud flaps is that they are relatively rigid and do not accommodate a range of fender configurations and sizes. Thus, manufacturers and retailers must supply countless different versions.

In view of these shortcomings, many vehicle operators simply forgo mud flaps. This holds true particularly for classic car enthusiasts, who tend to contemn any aftermarket, non-original equipment. In such cases, road grime and flying gravel can wreak havoc on fine vehicle finishes, not to mention the finishes and windshields of vehicles following behind.

The invention is directed to overcoming one or more of the problems as set forth above.

SUMMARY OF THE INVENTION

To solve one or more of the problems set forth above, in an exemplary implementation of the invention, a removable mud flap is provided. In one aspect of an exemplary implementation of the invention, the mud flap is provided with a panel member having a top mounting edge, and a malleable (i.e., pliant) engagement channel attached at the top mounting edge and adapted to frictionally and releasably engage a fender flange. The top mounting edge is curved to generally conform to the shape of a vehicle fender. The malleable engagement channel includes a generally u-shaped gripping surface and a plurality of opposed projections extending from said gripping surface and adapted to frictionally and releasably engage a fender flange without damaging the flange. An interior U-shaped gripping surface of the malleable engagement channel is devoid of screws, bolts, metallic clips and rivets, and other mechanical fastening items that may damage a finish of the gripped flange portion.

In another aspect of an exemplary implementation of the invention, the plurality of opposed projections may include a first gripping lip at or near the first free end and a second gripping lip at or near the second free end of the u-shaped gripping surface. The first gripping lip is angled away from the first free end and the second gripping lip is angled away from the second free end. The plurality of opposed projections may also include a first gripping rib and a second gripping rib opposite said first gripping rib. The first gripping rib may be angled away from the first free end and the second gripping rib may be angled away from the second free end.

In yet another aspect of an exemplary implementation of the invention, the malleable engagement channel may include an interior U-shaped gripping surface, an intermediate malleable U-shaped channel and an exterior surface, with the intermediate malleable U-shaped channel being sandwiched between the interior U-shaped gripping surface and the exterior surface. The intermediate malleable U-shaped channel is comprised of a malleable metallic material to provide pliancy to the channel. The interior U-shaped gripping surface and the exterior surface are comprised of a rubber, plastic or polymeric material. Likewise, the projections extending from the gripping surface are comprised of a rubber, plastic or polymeric material.

An optional aspect of an exemplary implementation of the invention includes a panel member comprised of a thermochromic, photochromic and/or phosphorescent additive.

BRIEF DESCRIPTION OF THE DRAWINGS

The foregoing and other aspects, objects, features and advantages of the invention will become better understood with reference to the following description, appended claims, and accompanying drawings, where:

FIG. 1 shows a first side view of an exemplary mud flap according to principles of the invention; and FIG. 2 shows a perspective view of an exemplary reinforced malleable engagement channel for a mud flap according to principles of the invention; and FIG. 3 shows a second side view of an exemplary mud flap according to principles of the invention.

Those skilled in the art will appreciate that the figures are not intended to be drawn to any particular scale. The invention is not limited to the exemplary embodiments depicted in the figures or the shapes, relative sizes, proportions or materials shown in the figures.

DETAILED DESCRIPTION

Figure 4:
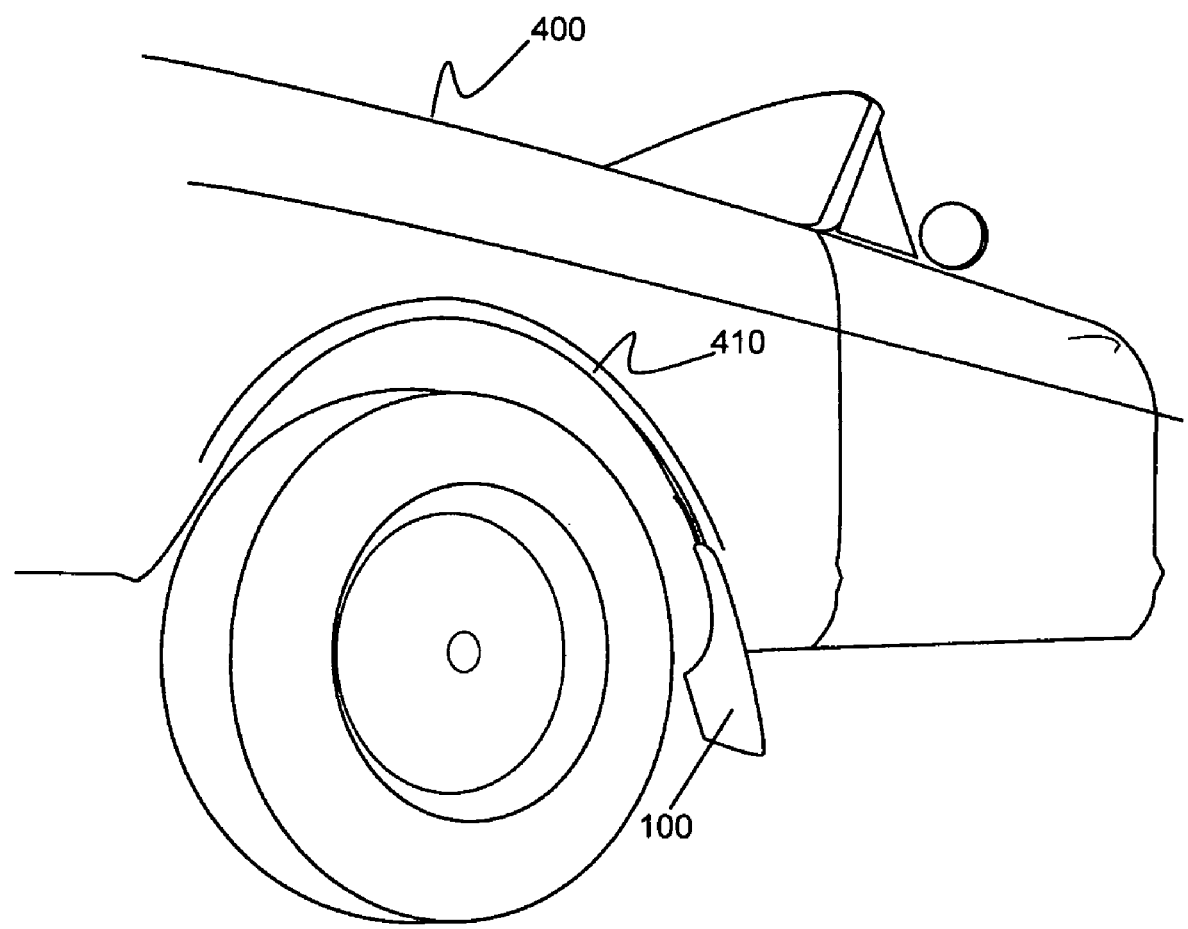
FIG. 4 shows a vehicle equipped with an exemplary mud flap according to principles of the invention.

Referring to the accompanying drawings, there is illustrated a mud flap generally indicated by reference numeral 100. The mud flap 100 is intended for use with a vehicle as in conventional mud flaps. The mud flap 100 is particularly suited for vehicles having flanged fenders 410 forming a wheel well of a body of the vehicle 400, as shown in FIG. 4. In the illustrated exemplary embodiment, only a driver side mud flap 100 is shown, however those skilled in the art will readily appreciate that the passenger side embodiment is a mirror image of the driver side embodiments shown.

The mud flap 100 is generally comprised of a panel member 120 which provides a shield for debris. The panel 120 may be formed of any durable sheet-like material, such as metal and/or plastic. In an exemplary implementation, the panel 120 is comprised of a rigid rubber, plastic or polymeric material, such as polyvinyl chloride (PVC), polyethylene, polypropylene, polystyrene, acrylics, cellulosics, acrylonitrile-butadiene-styrene terpolymers, urethanes, thermo-plastic resins, thermo-plastic elastomers (TPE), acetal resins, polyamides, polycarbonates and polyesters. While many other materials may be used alone or in combination with the aforementioned materials and/or other materials, without departing from the scope of the present invention, preferably the material is corrosion and weather resistant, impact resistant, durable, easy to clean, produces an aesthetically pleasing product and is relatively inexpensive and easy to manufacture. The material may further include additives to provide desired properties such as desired colors, structural characteristics, glow-in-the dark properties and thermal reactivity (e.g., color changes according to heat).

Optionally, by way of example and not limitation, the panel 120 may be formulated to change color when it reaches a predetermined or higher temperature. This can be accomplished by mixing a thermochromic additive to the panel 120 material in an amount that is sufficient to achieve a desired color changing range. As an example, a mixture of approximately 5% to 30% (pbw) of Matsui International Co., Inc.'s Chromicolor® concentrate may be introduced to the panel 120 material, to provide a plastic structure that visibly changes color at a determined elevated temperature, such as approximately 90 degrees Fahrenheit or higher.

Alternatively, a photochromic additive may optionally be added to the panel 120 material in an amount that is effective to achieve a desired color change when the panel 120 is exposed to certain lighting conditions. As an example, a mixture of approximately 5% to 35% (pbw) of Matsui International Co., Inc.'s Photopia® additive may be introduced to the panel 120 material, to provide a plastic structure that visibly changes color in the presence of sunlight or ultraviolet light.

As another alternative, phosphorescent polymer additives, such as aluminate based phosphors, may optionally be added to the panel 120 material to adsorb light energy and continue to release that energy as visible light after the energy source is removed. Advantageously, such an embodiment provides a panel that is easy to locate in darkened conditions, making the vehicle easy to spot even at nighttime.

The panel 120 may be formed with a substantially flat front side and backside, with textured or smooth surfaces and with or without ornamental features. Optionally, various reinforcing structures (e.g., reinforcing ribs) may be included, such as on the side of the panel facing the wheel, to increase structural integrity of the panel member 120 without compromising aesthetics of the mud flap 100. A curved top mounting edge 120a of the panel member 120 is arranged to be supported against a flanged portion of a vehicle fender, while a bottom free end 120b is arranged to be suspended downwardly from the vehicle as in conventional mud flaps. The outer side edge 120c of the panel member 120 is arranged to be positioned approximately adjacent to an outer side wall of the fender of the vehicle body when mounted on the vehicle so that the panel member 120 projects slightly outwardly. The inner side edge 120d of the panel member 120 is arranged to be positioned in the wheel well of the vehicle when the mud flap 120 is mounted on the vehicle.

The panel 120 may be produced using any suitable manufacturing techniques known in the art for the chosen material, such as (for example) injection, compression, structural foam, blow, or transfer molding; polyurethane foam processing techniques; vacuum forming; and casting. Preferably, the manufacturing technique is suitable for mass production at relatively low cost per unit, and results in an aesthetically acceptable product with a consistent acceptable quality.

A reinforced malleable engagement channel 110 is provided along the curved top mounting edge 120a of the panel member 120 of the mud flap 100. The reinforced malleable engagement channel 110 may be contoured to the shape of a fender flange. The channel 110 frictionally engages the flange to secure the mud flap to the fender. The channel 110 may be attached to the panel 120 using chemical or thermal bonding, mechanical fasteners or other attachment means. The channel 110 may be attached to the panel 120 at a few specific points, allowing the unattached portions to be bent slightly to the contour of a fender flange 410.

Figure 5:
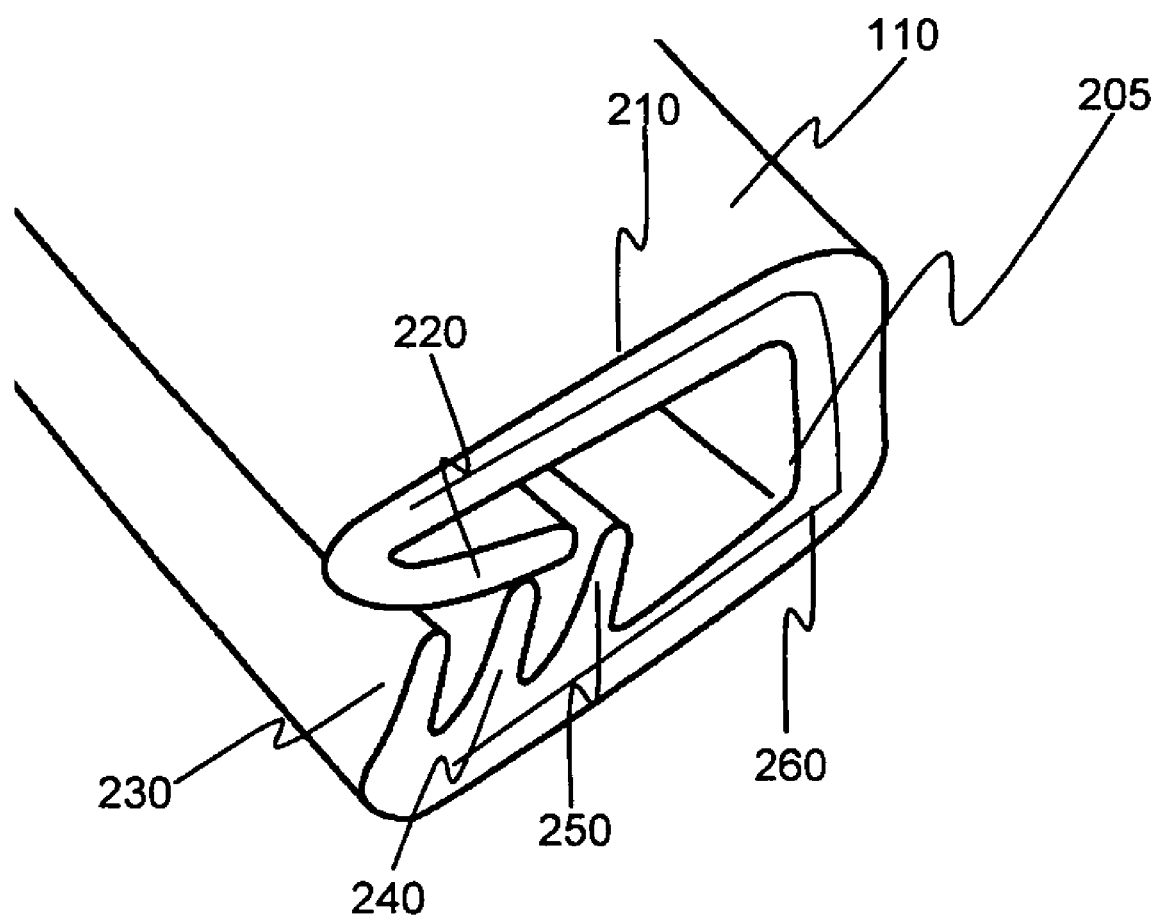
FIG. 5 shows a close-up perspective view of an exemplary reinforced malleable engagement channel for a mud flap according to principles of the invention.

Referring now to FIGS. 2 and 5, a perspective view of a reinforced malleable engagement channel 110 is provided. The channel 110 is comprised of generally U-shaped flange gripping strip. Generally, the channel 110 includes an interior U-shaped gripping surface 205, gripping lips 220 and 230 and ribs 240 and 250, an intermediate malleable U-shaped channel 260 and an exterior surface 210. Thus, the intermediate malleable U-shaped channel 260 is sandwiched between the interior U-shaped gripping surface 205 and the exterior surface 210.

The intermediate malleable U-shaped channel 260 provides rigidity to the channel 110 for securely engaging a fender flange, while allowing deformation of the channel 110 to a desired fender shape. The malleable U-shaped channel 260 may be comprised of a malleable metal such as steel, aluminum or other malleable metal or alloys thereof. The intermediate malleable U-shaped channel 260 provides a narrow reinforcing channel. The width across the channel is such that it provides a relatively tight fit in the interior channel opening so as to enable a fender flange 410 to be held therein merely by friction. The intermediate malleable U-shaped channel 260 may be provided with suitable coatings to prevent corrosion.

The interior U-shaped compartment of the channel 260 includes a plurality of projections 220, 230, 240 and 250 for frictionally engaging a flange. In particular, lips 220 and 230 and ribs 240 and 250 frictionally engage the fender flange 410. The free end of the lips 220 and 230 and ribs 240 and 250 are angled away from the entrance of the U-shaped channel to facilitate a smooth entry of the fender flange and to resist backing out. In a preferred implementation, free ends of opposed projections (e.g., lips and/or ribs) contact each other. As most fender flanges include a rolled bulbous edge, angled ribs and lips advantageously resist withdrawal of the flange. However, the invention is not limited to such angularly arranged protrusions. Frictionally engaging projections having other shapes and configurations may be utilized without departing from the scope of the invention. While two ribs 240 and 250 are shown on the same side of the interior U-shaped compartment, those skilled in the art will appreciate that other numbers of ribs, including zero ribs, may be used on each side of the interior U-shaped compartment without departing from the scope of the invention. However, preferably, each opposed side of the U-shaped channel includes at least one protrusion in the form of a lip, rib or other frictionally engaging projection to securely grip the flange.

By way of example and not limitation, the U-shaped gripping surface 205, gripping lips 220 and 230 and ribs 240 and 250 and exterior surface 210 may all be formed of a rubber, plastic, or polymeric material such as vulcanized, non-foam EPDM rubber by extrusion molding, injection molding, casting, or the like. EPDM exhibits excellent weather resistance, ozone resistance, durability, and impact resistance. EPDM also exhibits excellent high and low temperature characteristics.

The reinforced malleable engagement channel 110 may be formed using various manufacturing techniques. The malleable intermediate U-shaped channel 260 may be sandwiched between an exterior layer and an interior layer. Chemical and/or thermal bonds may securely attach the layers. Alternatively, the exterior and interior layers of the channel may be extrusion molded, injection molded, dip-formed or cast directly onto the malleable intermediate U-shaped channel 260. Methods of forming weather stripping for motor vehicles may be applied to produce a reinforced malleable engagement channel 110 according to principles of the invention.

To use a mud flap according to principles of the invention, the mud flap is positioned with the curved top mounting edge 120a of the panel member 120 adjacent to a flanged fender 410 portion of a vehicle 400, at the vehicle's wheel well. The reinforced malleable engagement channel 110 is matingly forced onto the flange 410 so that the channel engulfs a portion of the flange. The interior U-shaped gripping surface 205 protects the engaged flanged portion from scratching and damage. Gripping lips 220 and 230 and ribs 240 and 250 frictionally engage the flanged portion and resist withdrawal. The intermediate malleable U-shaped channel 260 allows the channel 110 to be deformed to match the contour and width of the engaged flanged portion. If necessary, the opening of the intermediate malleable U-shaped channel 260 may be contracted to facilitate release.

Removal of a mud flap according to principles of the invention entails exerting force to pull the mud flap from the flange. If necessary, the opening of the intermediate malleable U-shaped channel 260 may be expanded to facilitate release.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed. The physical embodiments described above merely exemplify the invention, which may be embodied in other specific structure within spirit and scope of the claims appended hereto.

What is claimed is:

1. A mud flap for attachment to a vehicle fender, said mud flap comprising:
   a panel member having a top mounting edge, and
   a malleable engagement channel attached at the top mounting edge and adapted to be contoured to the shape of and frictionally and releasably engage a fender flange of the vehicle fender, said frictional and releasable engagement securing the mud flap to the vehicle fender, said malleable engagement channel comprising an intermediate malleable channel sandwiched between an interior gripping surface and an exterior surface,
   said mud flap being devoid of mechanical fastening elements that may damage a finish of the vehicle fender.

2. A mud flap according to claim 1 wherein the top mounting edge is curved to generally conform to the shape of a vehicle fender.

3. A mud flap according to claim 1 wherein the gripping surface comprises a generally u-shaped gripping surface adapted to frictionally and releasably engage a fender flange.

4. A mud flap according to claim 1 wherein the gripping surface comprises a generally u-shaped gripping surface and a plurality of opposed projections extending from said gripping surface and adapted to frictionally and releasably engage a fender flange.

5. A mud flap according to claim 4 wherein the u-shaped gripping surface has a first free end and a second free end, and the plurality of opposed projections include a first gripping lip at or near the first free end and a second gripping lip at or near the second free end of the u-shaped gripping surface.

6. A mud flap according to claim 5 wherein the first gripping lip is angled away from the first free end and the second gripping lip is angled away from the second free end.

7. A mud flap according to claim 4 wherein the plurality of opposed projections include a first gripping rib and a second gripping rib.

8. A mud flap according to claim 7 wherein the u-shaped gripping surface has a first free end and a second free end, and the first gripping rib is angled away from the first free end and the second gripping rib is angled away from the second free end.

9. A mud flap according to claim 1 wherein the malleable engagement channel comprises an interior U-shaped gripping surface, an intermediate malleable U-shaped channel and an exterior surface, the intermediate malleable U-shaped channel being sandwiched between the interior U-shaped gripping surface and the exterior surface.

10. A mud flap according to claim 9 wherein the intermediate malleable U-shaped channel is comprised of a malleable metallic material.

11. A mud flap according to claim 9 wherein the interior U-shaped gripping surface is comprised of a material from the group consisting of a rubber material, plastic material and polymeric material.

12. A mud flap according to claim 9 wherein the exterior surface is comprised of a material from the group consisting of a rubber material, plastic material and polymeric material.

13. A mud flap according to claim 10 wherein the interior U-shaped gripping surface is comprised of a material from the group consisting of a rubber material, plastic material and polymeric material.

14. A mud flap according to claim 13 wherein the exterior surface is comprised of a material from the group consisting of a rubber material, plastic material and polymeric material.

15. A mud flap according to claim 14, wherein the interior U-shaped gripping surface includes a plurality of opposed projections extending from said gripping surface and adapted to frictionally and releasably engage a fender flange, said projections being comprised of a material from the group consisting of a rubber material, plastic material and polymeric material.

16. A mud flap according to claim 1, wherein the gripping surface comprises an interior U-shaped gripping surface defining a cavity, a plurality of opposed gripping lips protruding into said cavity, a plurality of gripping ribs protruding into said cavity, and said intermediate malleable channel comprises an intermediate malleable U-shaped channel disposed between said interior U-shaped gripping surface and said exterior surface.

17. A mud flap according to claim 16, wherein the panel member is comprised of a material from the group consisting of a thermochromic additive, a photochromic additive and a phosphorescent additive.

18. A mud flap according to claim 16 wherein the intermediate malleable U-shaped channel is comprised of a malleable metallic material, the interior U-shaped gripping surface is comprised of a material from the group consisting of a rubber material, plastic material and polymeric material, the exterior surface is comprised of a material from the group consisting of a rubber material, plastic material and polymeric material, and the plurality of gripping ribs are comprised of a material from the group consisting of a rubber material, plastic material and polymeric material.

19. A mud flap according to claim 16 wherein the interior U-shaped gripping surface is devoid of screws, bolts, metallic clips and rivets.

20. A mud flap according to claim 19, wherein the malleable U-shaped channel is adapted for bending to conform to the shape of a fender flange.

* * * * *